United States Patent
Mahy et al.

(10) Patent No.: US 8,054,504 B2
(45) Date of Patent: Nov. 8, 2011

(54) MULTICOLORANT SEPARATION SYSTEM AND METHOD

(75) Inventors: Marc Mahy, Wilsele (BE); Francis Verbeeck, Berchem (BE)

(73) Assignee: Agfa Graphics NV, Mortsel (BE)

( * ) Notice: Subject to any disclaimer, the term of this patent is extended or adjusted under 35 U.S.C. 154(b) by 478 days.

(21) Appl. No.: 12/281,155

(22) PCT Filed: Mar. 1, 2007

(86) PCT No.: PCT/EP2007/051937
§ 371 (c)(1), (2), (4) Date: Aug. 29, 2008

(87) PCT Pub. No.: WO2007/099140
PCT Pub. Date: Sep. 7, 2007

(65) Prior Publication Data
US 2009/0009787 A1    Jan. 8, 2009

Related U.S. Application Data

(60) Provisional application No. 60/783,772, filed on Mar. 17, 2006.

(30) Foreign Application Priority Data

Mar. 3, 2006    (EP) .................................. 06110628

(51) Int. Cl.
*H04N 1/60* (2006.01)
(52) U.S. Cl. .......... 358/1.9; 358/515; 358/517; 358/518
(58) Field of Classification Search .................. None
See application file for complete search history.

(56) References Cited

U.S. PATENT DOCUMENTS

| | | | | |
|---|---|---|---|---|
| 5,563,724 A | * | 10/1996 | Boll et al. | 358/502 |
| 5,745,120 A | | 4/1998 | De Baer et al. | |
| 5,857,063 A | * | 1/1999 | Poe et al. | 358/1.9 |
| 5,870,530 A | * | 2/1999 | Balasubramanian | 358/1.9 |

(Continued)

FOREIGN PATENT DOCUMENTS

EP    0 763 927 A1    3/1997

(Continued)

OTHER PUBLICATIONS

Official Communication issued in International Patent Application No. PCT/EP2007/051937, mailed on May 2, 2007.

(Continued)

*Primary Examiner* — King Poon
*Assistant Examiner* — Dung Tran
(74) *Attorney, Agent, or Firm* — Keating & Bennett, LLP (57) ABSTRACT

A method separates a color vector into a colorant vector for a printing system that uses more than four colorants, for example cyan, magenta, yellow, black, orange and green colorants. According to the method, the separation process is split up into partial four colorant processes that contain opponent colors. For example, a first partial process is a cyan, magenta, yellow and black process; a second one is an orange, magenta, yellow and black process; and a third one is a cyan, green, yellow and black process. Continuity of magnitudes of the colorants is achieved across the boundaries of the color gamuts of the partial processes by imposing specific constraints on the combinations of colorants to render a given color. A computer implemented system and a print system are based on the method.

12 Claims, 4 Drawing Sheets

U.S. PATENT DOCUMENTS

| | | | |
|---|---|---|---|
| 5,892,891 A * | 4/1999 | Dalal et al. | 358/1.9 |
| 5,963,201 A * | 10/1999 | McGreggor et al. | 715/722 |
| 6,469,804 B1 * | 10/2002 | Ott et al. | 358/1.9 |
| 6,483,606 B1 * | 11/2002 | Klassen et al. | 358/1.9 |
| 7,164,498 B2 * | 1/2007 | Van Bael | 358/1.9 |
| 7,466,448 B2 * | 12/2008 | Yamamoto et al. | 358/1.9 |
| 7,506,584 B2 * | 3/2009 | Bestmann | 101/483 |
| 2003/0234943 A1 * | 12/2003 | Van Bael | 358/1.9 |
| 2004/0183814 A1 * | 9/2004 | Saito | 345/601 |
| 2005/0150411 A1 * | 7/2005 | Bestmann | 101/484 |
| 2005/0179727 A1 * | 8/2005 | Bestmann | 347/43 |
| 2005/0195420 A1 | 9/2005 | Gerrits | |
| 2005/0200902 A1 * | 9/2005 | Mahy | 358/3.23 |
| 2009/0086223 A1 * | 4/2009 | Mahy et al. | 358/1.9 |

FOREIGN PATENT DOCUMENTS

| | | |
|---|---|---|
| EP | 0 833 500 A2 | 4/1998 |
| EP | 1 083 739 A2 | 3/2001 |
| EP | 1 146 726 A1 | 10/2001 |

OTHER PUBLICATIONS

Wyszecki et al.: "Color Science: Concepts and Methods, Quantitative Data and Formulae," 2nd edition, John Wiley and Sons, Inc.; pp. 164-168; 1982.

Many et al.: "Inversion of the Neugebauer Equations," Color Research and Application; vol. 21; No. 6; pp. 404-411; Dec. 1996.

* cited by examiner

MULTICOLORANT SEPARATION SYSTEM AND METHOD

CROSS-REFERENCE TO RELATED APPLICATIONS

This application is a 371 National Stage Application of PCT/EP2007/051937, filed Mar. 1, 2007. This application claims the benefit of U.S. Provisional Application No. 60/783,772, filed Mar. 17, 2006, which is incorporated by reference herein in its entirety. In addition, this application claims the benefit of European Application No. 06110628.2, filed Mar. 3, 2006, which is also incorporated by reference herein in its entirety.

BACKGROUND OF THE INVENTION

1. Field of the Invention

The present invention relates to an image processing method for rendering color images on a printer. More specifically, the present invention relates to a color separation method. Even more specifically, the present invention relates to a color separation method for a print process that, besides cyan, magenta, yellow and black colorants, includes additional colorants such as orange, green or blue colorants.

2. Description of the Related Art

Color printing systems generally rely on subtractive color mixing of a set of colorants to render different colors. A set of colorants that is widely used includes cyan, magenta, yellow and black colorants. A color separation process separates a color in a digital document into a set of colorant magnitudes that, when printed on top of each other, yield a faithful rendering of the color. A color separation process is usually based on inverting a mathematical printer model that expresses color as a function of printed colorant amounts. The coefficients of the function are usually obtained by printing and measuring a printer target of which the colorant values are specified.

The color separation for a cyan, magenta, yellow and black printing process involves a transformation from a three dimensional color space into a four dimensional colorant space. This additional degree of freedom is resolved by introducing additional constraints on the relationships between the magnitudes of the colorants. For example, a possible constraint could be that a given color should be rendered with the predetermined magnitude of black colorant in combination with magnitudes of cyan, magenta and yellow colorants. Setting constraints on the amount of black colorant is commonly referred to as a "grey component replacement" strategy.

The range of colors that a color print process is capable of rendering is called its color gamut. Practical constraints, such as the limited capability of a substrate to absorb large amounts of colorants in a given amount of time, may put limitations on the printable color gamut. Another limitation of the printable color gamut results from the broadband nature of absorption spectra of the cyan, magenta and yellow colorants. For example, a magenta dye not only absorbs light in the green portion of the visible spectrum, but to some extent also in the blue and red portions of the visible spectrum. When the magenta colorant is subtractively mixed with a cyan colorant to render a blue color, the blue color will look darker than expected because a considerable amount of the blue portion of the spectrum is absorbed by the magenta colorant. As a result, subtractive color rendering using commercial magenta and cyan colorants does not enable reproducing blue colors that are both bright and saturated. For similar reasons, subtractive color rendering using the available cyan, magenta and yellow colorants fails to render bright and saturated orange and green colors.

The printing industry addresses the above problems by using additional colorants that specifically target blue, orange and green portions of the visible spectrum. While this method is expensive, since it requires the use of additional printing stations to print these additional colorants, the solution is common in the packaging industry, where bright and saturated colors support the sale of a product.

The use of additional colorants greatly complicates the color to colorant separation process.

A first problem that arises is that no standardized targets exist for print systems that use more than four colorants. Additionally, such targets would create problems in printing, as most print processes break up when more than four colorants are printed on top of each other.

Another problem is that the introduction of additional colorants also introduces additional degrees of freedom that need to be managed in the color separation, i.e., the separation of color into five or more colorants is considerably more complex to manage than the separation of a color into four colorants.

SUMMARY OF THE INVENTION

A specific problem that needs to be resolved is that any trajectory of colors that is orbited through the color gamut of a print process having five or more colorants needs to be separated into a continuous set of colorants In order to overcome the problems described above, preferred embodiments of the present invention provide a print process that uses cyan, magenta, yellow and black colorants complemented with at least one opponent colorant such as an orange, green or blue colorant.

The print process is broken up into partial four colorant processes. A first partial print process is the cyan, magenta, yellow and black process. The other partial processes are obtained by replacing in the previous partial print process the cyan, magenta or yellow colorants by their opponent colorant.

Each of the partial print processes has an associated color gamut. As will become clear from the preferred embodiments of the present invention, each color that falls within the color gamut of a partial print process can be rendered using a magnitude of a colorant of which the range is constrained between a minimum and a maximum magnitude.

According to a preferred embodiment of the present invention, if a color falls within the color gamut of a first partial print process, it is separated using the maximum magnitude of a first colorant to render the color. If a color falls within the color gamut of a second partial print process but not within the color gamut of the first partial print process, it is separated using the minimum magnitude of the opponent of the first colorant to render the color.

The method results in a continuous variation of colorant magnitudes across the boundaries of the color gamuts of the two partial print processes.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Color and Color Space

The color of an object refers to the way the electromagnetic spectrum that it radiates is perceived by a human observer.

A color can be represented by a color vector including components of which the magnitudes correspond with the energy magnitudes of a set of primary colors that, when additively mixed, yield visually the same impression to the observer as the color.

It has been demonstrated that a vector having three components is sufficient to represent a color in a unique way to a standard observer. In that case, the color space is three dimensional.

The three components can correspond to a set of three real primaries, such as a red, green and blue primary, or a set of three virtual primaries such as the CIE XYZ primaries. A characteristic of the CIE XYZ set of primaries is that they correspond with the integrated responses as measured through a set of three spectral filters that are linear combinations of the receptor responses of the human visual system of a standard observer.

Another approach uses a transformation of the coordinates in the CIE XYZ primary system to yield a locally psychovisually uniform color space. This is the basis of the three dimensional CIE Lab color space.

More information on the subject of color spaces is found in the publication "Color Science: Concepts and Methods, Quantitative Data and Formulae" (2nd ed.) by G. Wyszecki & W. S. Stiles, published in 1982 Wiley (New York), pp. 164-168.

Color appearance models are designed to take into effect the observation that the psychovisual appearance of a color stimulus may be affected by the presence of other visual stimuli. An example of such a color appearance model is the CIECAM02 color space, which expresses colors in terms of three dimensions having a semantic interpretation such as lightness, hue and saturation.

Color spaces are also referred to as device independent spaces.

Colorant, Substrate, and Colorant Space

A colorant means a substance that induces a color or modifies the hue of something else by absorbing, reflecting or emitting visible light. The absorption, reflection or emission can be spectrally flat, or it can be spectrally selective.

A colorant can be a conventional pigmented or dyed ink or colorant, but it can also be wax, a water repellent substance, an adhesive or a plastic. Usually a colorant is not a pure compound, but a complex mixture including several components such as dyes, pigments, surfactants, binders, fillers, solvents, water and dispersants, each component serving a specific function. The colorant could also be a material of which the viscosity or phase changes with temperature, such as wax. Specifically mentioned also are colorants that polymerize, for example, under influence of electromagnetic radiation such as UV light. This process is called curing.

A colorant magnitude represents an amount of light absorption, reflection or emission. A colorant magnitude can be represented on a scale from 0% to 100%, for example, to represent a magnitude of the colorant that ranges from minimum absorption on a substrate to maximum absorption. A colorant magnitude can also be represented using an eight bit word on a scale from 0 to 255, for example, corresponding with a range from minimum to maximum emission in the case of a display system. Other possibilities also exist, e.g., colorant magnitudes represented on a 1 bit, a 12 bit or a 16 bit scale.

A colorant vector is a vector of which the components are colorant magnitudes. A colorant vector can be represented in a colorant space of which the dimensions correspond with the colorant magnitudes.

A substrate could be paper, but it could also be textile, a synthetic foil or a metal plate on which colorant is laid down by a an output device.

Pixel and Image

A pixel is a two dimensional spatial unit to which a color or colorant vector is associated.

An image is a spatial two dimensional arrangement of pixels. Within the scope of the preferred embodiments of the present invention, an image also includes a sequence of temporally related images, for example, for rendering motion pictures or television images. Also included are compressed images, i.e., images on which signal processing techniques have been applied to reduce pixel and coding redundancies.

Output Device

An output device means a hardware device that is capable of rendering images. In the preferred embodiments of the present invention, rendering and printing both refer to the process of rendering an image on an output device, whatever its nature. An output system is a system that includes an output device, but typically also software and hardware peripherals to operate the device, such as printer drivers, color correction and digital halftoning software and the systems they run on. In the preferred embodiments of the present invention, the rendering of color by an output device or system will be referred to as a rendering process, or, in short, a process.

Output devices include display and printing devices. Examples of display devices include CRTs, LCDs, plasma and projection displays. Most of these devices can render both static and motion pictures. Examples of printing technologies include printers for photographic paper, electrophotographic printers, thermal transfer printers, dye sublimation printers, ink jet printers, offset printers, gravure printers and flexographic printers.

An output device can be monochrome or color, depending on its capabilities to render monochrome or color images. A device that is capable of independently varying for each pixel the magnitude of n distinct colorants is said to have an n-dimensional colorant space, wherein each dimension corresponds with one of the colorants. Such a device is capable of printing a pixel having an n-dimensional colorant vector.

Take, for example, an offset printing press. Most offset presses are operated using cyan (C), magenta (M), yellow (Y) and black (K) inking stations. The number of colorants and hence the dimensionality of the colorant space is four.

The colorant space that is associated with an output device is sometimes referred to as a device dependent colorant space, wherein the device refers to the output device.

The colorant gamut of an output device corresponds with all possible combinations of colorant magnitudes that the output device is capable of rendering.

In the absence of any limitations on colorant combinations, the colorant gamut associated with a process having an n-dimensional color space is an n-dimensional cube. In most practical situations not all possible colorant combinations are acceptable for rendering. Such a limitation on combining different colorant magnitudes reduces the colorant gamut.

In the preferred embodiments of the present invention, preferably linear colorant limitations are considered. A linear colorant limitation means that a hyperplane in an n-dimensional colorant space divides the space into two subspaces, one of which includes colorant combinations that are deemed acceptable for rendering, the other subspace including only colorant combinations that are deemed not acceptable for rendering.

The coefficients of such a hyperplane can be selected to "cut off" a portion of the volume of an n-dimensional colorant cube with the effect that the volume of the colorant gamut that can be rendered is reduced.

In practice, one or more hyperplanes can be used to restrain the colorant combinations that can be rendered. One set of hyperplanes that limits the colorant gamut corresponds with having one of the colorants hitting either its minimum or its maximum magnitude.

A person skilled in the art will appreciate that the technique of using multiple hyperplanes can also be used to approximate colorant constraints that are not linear in nature.

Output Device Model and Model Inversion

An output device model is a function that expresses what color vector results from printing a colorant vector on an output system.

According to a preferred embodiment of the present invention, an output device model is preferably a continuous function.

An n-dimensional rendering process is characterized if:
its output device model is defined; and
its colorant gamut is defined (specifically including colorant limitations).

The coefficients of an output device model are preferably determined using an output device target. Such a target consists of a number of patches of which the colorant vectors are specified. By printing the target, and measuring the color of the patches, a relationship between colorant vectors and the resulting color vectors can be determined.

An example of an output device target is the IS12642 target (formerly called ANSI IT 8.7/3 target).

Preferably, the patches of an output device target are combinations of a set of sampling points along the different dimensions in colorant space. By making all the possible combinations of the sampling points, an ordered grid of points in colorant space is defined.

In a preferred embodiment of the present invention, an output device target includes all the points of the ordered grid. In the preferred embodiments of the present invention, such an output device target is referred to as "complete". In another preferred embodiment of the present invention, an output device target includes only a subset of points of the ordered grid. In the preferred embodiments of the present invention, such a target is referred to as "incomplete". The document EP-A-1 146 726 teaches that it is possible to print and measure an incomplete output device target and to use the color vectors of the grid points of the incomplete output device target to derive color vectors for grid points that belong to a complete output device target.

Before an output device target is rendered by an output device, the output device is preferably first calibrated. Calibration involves normalizing for each colorant separately the relationship between a colorant magnitude and the resulting color to a predefined standard.

The document EP-A-1 083 739 teaches that this relationship between colorant magnitude and at least one dimension of the resulting color is preferably substantially uniform on a psychovisual scale.

An output device model enables to predict in what color vector the rendering of a colorant vector results. In the preferred embodiments of the present invention, model inversion refers to the process of inverting an output device model so that colorant vectors can be predicted that, when rendered, yield a given preset color vector.

An example of an output device model and a technique to invert the model is found in the article by Marc Mahy and Paul Delabastita, "Inversion of the Neugebauer Equations," Color Research and Application, Vol. 21, No 6, pp. 404-411.

A color image can include millions of pixels. For converting between the color and colorant vectors of these pixels, preferably a look-up table in combination with an efficient interpolation algorithm is used, because this approach is computationally more efficient than an evaluation pixel-by-pixel of an output device model and/or model inversion.

In the preferred embodiments of the present invention, a forward look-up table includes colorant vectors as the entries and color vectors as data points. A forward look-up table is populated by evaluating an output device model for its entries.

Similarly, an inverse look-up table includes color vectors as the entries and colorant vectors as data points. An inverse look-up table is populated by evaluating the inverse output device model.

In the preferred embodiments of the present invention, forward look-up tables are also referred to as color tables, whereas inverse look-up tables are also referred to as color separation tables.

Color Gamut of an Output Device

The color gamut of an output device is the range of the colors that results from printing the colorant gamut.

As mentioned before, the colorant gamut of an n-colorant process is limited by hyperplanes in the n-dimensional colorant space.

The color gamut is found by mapping the hyperplanes to the color space, and preserving only these colors that are on the "proper" side of the mapped hyperplanes.

For example, a C, M and Y print process has a three dimensional colorant space in which the colorant gamut is a three dimensional cube limited by the 6 surfaces that correspond to C=0%, C=100%, M=0%, M=100% Y=0%, Y=100%. Each of the 6 surfaces can be mapped using the output device model to surfaces in a color space. The surfaces define the color gamut of the print process.

In the case of a four dimensional C, M, Y and K process, the colorant gamut is a four dimensional cube limited by eight hyperplanes. The hyperplanes are three dimensional in nature and correspond to the combinations of setting the four colorants to either their minimum or maximum magnitude. Each of the hyperplanes can be mapped into a volume in color space that is delimited by six surfaces. The printable gamut of the four colorant process is a volume defined by the cross-section of the eight volumes in color space.

Opponent Colorants

According to a preferred embodiment of the present invention, a print process using C, M, Y and K colorants is complemented by at least one opponent colorant. In the preferred embodiments of the present invention, an opponent colorant is defined with respect to the hue of another colorant.

Figure 3:
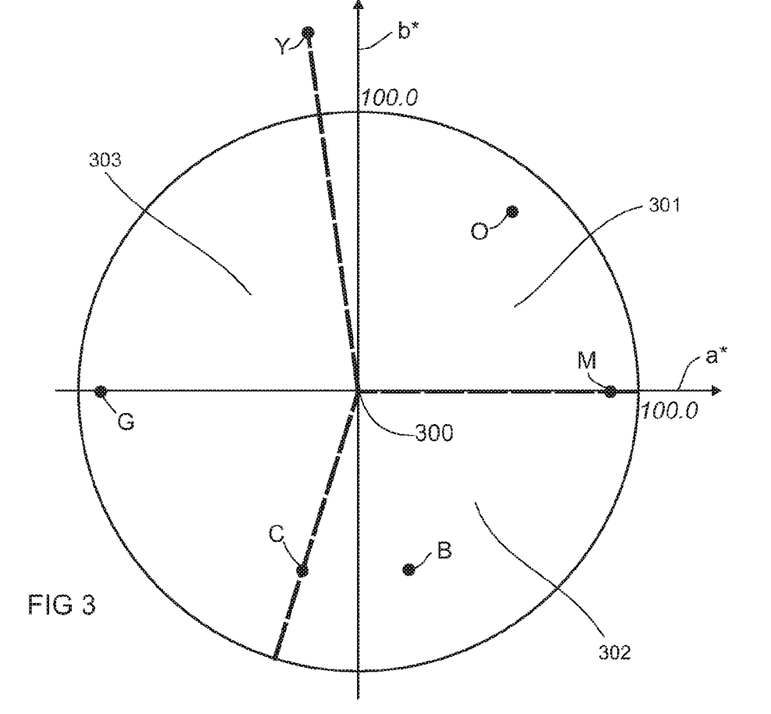
FIG. 3 shows the coordinates of cyan (C), magenta (M), yellow (Y), orange (O), green (G) and blue (B) colorants in a CIE a*b* diagram.

Referring to FIG. 3, a CIE a*b* diagram shows the coordinates of the C, M, Y, orange (O), green (G) and blue (B) colorants. By connecting the point corresponding to the neutral color 300 in the diagram (which corresponds with the origin of the CIE a*b* diagram) with the chromaticities of the C, M and Y colorants, the diagram is divided into three sectors 301, 302, 302. A first colorant is said to be an opponent colorant with regard to a second colorant, when the CIE a*b* coordinates of the second colorant are in a sector that is not neighboring to the two sectors to which the first colorant belongs. For example, referring to FIG. 3, the O colorant is an opponent to the C colorant, and the G colorant is an opponent to the M colorant. The opponent relation is symmetric, i.e., when a first colorant is said to be an opponent of a second colorant, then the second colorant is an opponent to the first colorant. Both colorants are each other's opponent.

Preferably, the hues of opponent colorants differ between 150 and 210 degrees in the CIE a* b* diagram.

Complementing a four ink print process by introducing an opponent colorant increases the dimensionality of the print process by one. For example, complementing a CMYK process by adding 0 and G colorants increases the dimensionality from four to six.

By way of example, the remaining preferred embodiments of the present invention will focus on print processes that are based on a CMYK print process that have been complemented with opponent colorants, however other combinations of colorants also fall within the scope of the present invention.

According to various preferred embodiments of the present invention, a main print process having a dimensionality that exceeds four is preferably broken down in partial print processes having a dimensionality of four, wherein one of the partial print processes is the CMYK process, and the other partial print processes are obtained by replacing one colorant in the CMYK print process by its opponent.

For example, a six dimensional print process using C, M, Y, K, O and G colorants (CMYKOG) is preferably broken down into three four colorant processes including:

a CMYK process
a OMYK process (C replaced by O)
a CGYK process (M replaced by G)

In the preferred embodiments of the present invention, this specific example is further elaborated.

Each of the four dimensional partial colorant processes has a four dimensional colorant gamut and a corresponding color gamut.

Figure 4:
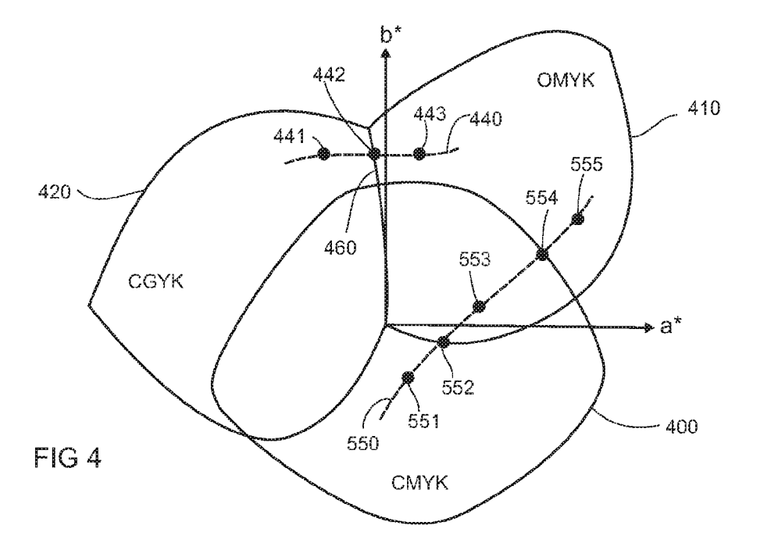
FIG. 4 shows a cross-section of the color gamuts of three four colorant processes in a CIE a*b* diagram, including a number of trajectories that cross color gamut boundaries.

A convenient two dimensional representation of a color gamut is obtained by making a cross-section in the CIE L*a*b* space for a constant value of L*, and plotting the cross-section. FIG. 4 shows such a cross-section (400, 410, 420) for three of the above four colorant processes.

The OMYK process and the CGYK process share all the possible combinations of Y and K (YK) in the colorant domain. As a result, the YK square surface that is common to the colorant domains of both processes maps to a common surface that separates their respective color gamuts. These two color gamuts hence do not overlap. The curved line 460 corresponds with the cross-section for a constant CIE L* of the surface.

FIG. 4 indicates that a considerable overlap exists between the color gamuts of the CMYK process and the OMYK process. This is expected as at least all the printable combinations of the M, Y and K colorants (MYK) are shared by both print processes. That is not to say that only those combinations are part of the common portion of the color gamut. For example, colorant combinations including O in the OMYK print process may also be rendered using a CMYK colorant combination.

An incremental variation of a colorant vector within the (four dimensional) colorant gamut corresponds with an incremental variation of a corresponding color vector within the (three dimensional) color space.

Assuming that the relationship between variations of a four dimensional colorant vector and a three dimensional color vector is (at least locally) linear, this means that within the colorant gamut one colorant component can be selected independently to result in a predefined color vector variation.

Inversely, this means that the conversion of a color within the color gamut of a four ink process into a set of four colorants is initially undetermined and that one of the four components of the colorant component needs to be selected.

In a CMYK process, typically the magnitude of the K colorant is selected using an independent strategy, and the CMY colorant components are calculated to yield the desired color.

The selection of the magnitude of K colorant is constrained by the fact that all four colorants should remain in a range between 0% and 100% that can be physically realized. This results for every color in the printable gamut in a minimum magnitude and a maximum magnitude of K colorant that can practically be used. A minimum magnitude for a K colorant would mean that if the magnitude is decreased, it would require at least one of the other colorants to exceed its maximum magnitude (which is not physically realizable) to render the same color. A maximum magnitude of a K colorant would mean that if the magnitude is exceeded, it would require at least one of the other colorants to become negative (which is not physically realizable) to render the same color.

In a print process that uses an opponent colorant, the opponent colorant is preferably selected first using an independent strategy. Similar to the CMYK process, for every color within the color gamut of a four colorant process including an opponent colorant, the opponent colorant has a minimum and a maximum magnitude.

In what follows, a number of assumptions are made on the nature of the partial print processes.

First Assumption

For colorant combinations of the CMYK process, it is assumed that separating a given color with a larger magnitude of K colorant results in a decrease of the C, M and Y (CMY) colorants and vice versa. In other words, if two different CMYK colorant combinations yield the same color, the one having the larger magnitude K colorant will also have lower magnitudes of the CMY colorants than the other.

This assumption is acceptable, as decreasing a magnitude of K colorant, which uniformly absorbs all wavelengths of the visible spectrum, has to be compensated by an increase of the magnitudes of the three subtractive primaries to keep the color constant.

Similarly, in an OMYK process it is assumed that the variation of magnitude of an O colorant can be exchanged for an opposite variation of the MYK colorants. Mutatis mutandis, a similar reasoning can be made for CGYK and CMBKs processes.

Second Assumption

If a color vector belongs to a portion of the color gamut boundary of a first four colorant process having a first colorant that lies within the gamut of a second four colorant process having a colorant that is an opponent to the first colorant, than the color vector is separated into a colorant vector for the first process wherein the component of the first colorant has a magnitude of zero.

Figure 5:
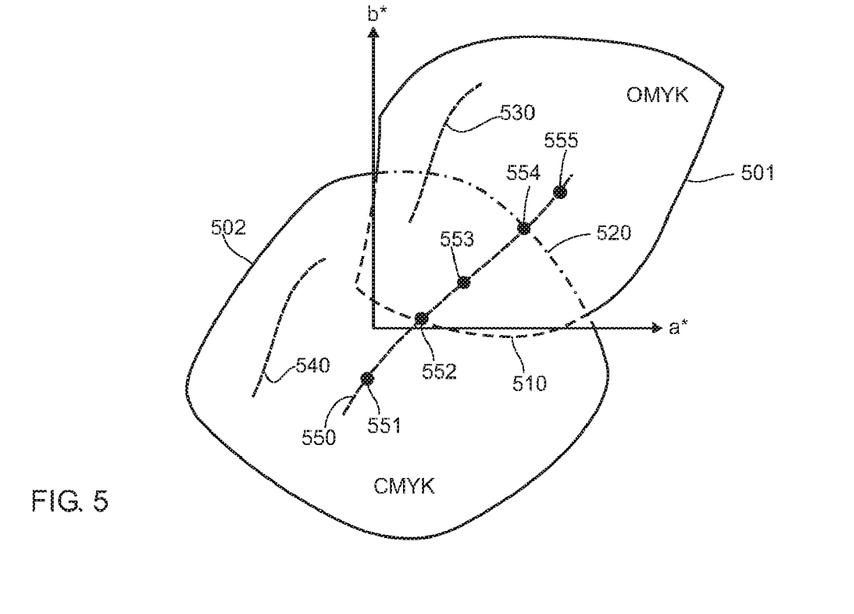
FIG. 5 shows a cross-section of the color gamuts of two four colorant process in a CIE a*b* diagram including a trajectory crossing a color gamut boundary.

Referring to FIG. 5, the second assumption means, for example, that a color vector 554 on the boundary 520 of the CMYK color gamut 502 that also belongs to the color gamut 501 of an OMYK process is separated into a CMYK colorant vector in which c=0.

This assumption becomes plausible by recognizing that such a color vector lies at the opposite portion of the C colorant itself in the CMYK color gamut 502.

Similarly, it is plausible to assume that a color vector 552 in FIG. 5 on the boundary of an OMYK color gamut 501 and lying within the color gamut 502 of a CMYK process is separated in a OMYK colorant vector in which the O component has a magnitude of zero, because such a color vector lies at the opposite portion of the O colorant in the OMYK colorant gamut 501.

The same assumptions are made for the parts of the color gamut boundary that are shared between the CGYK and CMYK colorant processes, and between the CMBK and CMYK colorant processes.

Third Assumption

The print model of a four colorant process is continuous. This is usually the case, as the output device model describes a physical process that is continuous in nature.

Fourth Assumption

The model inversion of the four colorant processes is also continuous. This assumption requires that the method to determine an independent variable in the model inversion process, for example, the magnitude of the K colorant or of an opponent colorant, preserves the continuity between the colorant magnitudes.

Continuity of Colorant Magnitudes Across Color Gamut Boundaries

A problem that needs to be resolved is when two four colorant processes share a portion of their color spaces. Specifically, a problem that needs to be resolved is that a trajectory of color vectors that is orbited across color gamut boundaries needs to be separated into colorant vectors having a continuous set of components.

First Case: Colorant Gamuts Share Two Colorants

A first case involves the boundary between the color gamuts of two four colorant processes that share two colorants such as, for example, a CGYK process and an OMYK process. The colorant gamuts of both processes share the YK plane in the colorant gamut, and in color space the YK plane is mapped onto a surface 460 that separates the color gamut of the OMYK color gamut from the CGYK color gamut.

A color vector 443 on one side of the boundary 460 can only be rendered using combinations of OMYK colorants, while a color vector 441 on another side of the boundary 460 can only be separated using combinations of CGYK colorants. A color vector 442 that belongs to the boundary 460 itself is rendered using non-zero magnitudes of Y and K colorants only. A color vector 442 that belongs to the boundary 460 is separated into the same Y and K colorant magnitudes by separating it either into a CGYK colorant vector (in which case the CG colorants are zero) or into an OMYK colorant vector (in which case the OM colorants are zero).

Referring to the fourth assumption, this means that a trajectory 440 of color vectors 441-443 that crosses the color gamut boundary of two four ink processes having two colorants in common, results in a colorant vectors having a continuous set of colorant magnitudes.

Second Case: Colorant Gamuts Share Three Colorants

The situation is more complex if the overlapping portions of the color gamuts of printing processes share three colorants, such as the CMYK and the OMYK process, or the CMYK and the CGYK processes.

According to a preferred embodiment of the present invention, a separation technique converts a color vector into a colorant vector for a main print process wherein the colorant vector includes two opponent colorant components, called a first and a second opponent colorant component.

For example, a CMYKO main print process includes components corresponding to C, M, Y, K and O colorant magnitudes in which the C and O colorants are opponents.

Identifying Partial Print Processes

A first step according to a preferred embodiment of the present invention includes identifying a first partial print process including the first opponent colorant but not its opponent, and a second partial print process including the second opponent colorant but not its opponent.

A partial print process means a print process that uses a subset of the set of colorants of a main print process. According to a preferred embodiment of the present invention, a main print process includes five colorants or more, and a partial print process includes four colorants.

The first partial print process has a first colorant gamut and an associated first color gamut and the second partial print process has a second colorant gamut and an associated second color gamut.

Returning to the example, a first partial print process could be an OMYK process, including the O opponent colorant, and a second partial print process the CMYK process including the C opponent colorant.

A next step includes separating a color vector into a colorant vector. This is done in a way that depends on within which color gamut(s) the color vector resides. Several preferred embodiments are discussed.

First Preferred Embodiment

According to a first preferred embodiment, a color vector that belongs to the first color gamut is preferably separated into a colorant vector having the first opponent colorant component at its maximum possible magnitude. This is preferably the case for both a color vector that belongs to only the first color gamut, or for a color vector that belongs to both the first and the second color gamut.

According to the same preferred embodiment, a color vector that belongs to the second color gamut, but not to the first color gamut, is preferably separated into a colorant vector having the second opponent colorant component at its minimum magnitude.

The present inventors have discovered that the above approach results in continuity of the colorant vector component magnitudes along a trajectory of color vectors that orbits across the color gamut boundary between the first and second color gamuts. This is explained with reference to of an example.

Referring to FIG. 5, a first color gamut 501 corresponds with a first partial OMYK process and a second color gamut 502 with a second partial CMYK process.

Based on the Fourth Assumption above, the separated colorant vector magnitudes vary continuously for an orbit along any trajectory 530 within the color gamut of the first partial OMYK process. Similarly, the separated colorant vector magnitudes vary continuously for any trajectory 540 within the color gamut of the second partial CMYK process that is not shared with the color gamut of the first partial process. So the continuity requirement in those portions of the color gamut is fulfilled.

Referring to the Second Assumption above, a color vector 552 belonging to a boundary 510 of the first color gamut 501 within the second color gamut 502 is separated into an OMYK colorant vector including non-zero MYK magnitudes only.

The same result, however, is obtained, and is obtainable, by separating the same color vector 552 in a CMYK colorant vector by using a minimum magnitude for the C colorant.

This demonstrates that a trajectory 550 of color vectors 551-555 that orbits across a color gamut boundary 510 of the first partial process and that is part of the color gamut 502 of the second process results in a continuous variation of the colorant component magnitudes.

Referring to the First Assumption above, minimizing the C colorant in a partial print process that is a CMYK process is equivalent to maximizing the magnitude of the K colorant in the print process and vice versa.

A first example using a first preferred embodiment can hence be summarized as:

use the maximum magnitude of O colorant for separating the colors within the OMYK color gamut, and use the maximum magnitude of K colorant (minimum magnitude C colorant) for colors belonging to the CMYK gamut but not to the OMYK color gamut.

A similar reasoning can be made by switching the roles of the first and the second partial print process. In that case, a color vector 554 on a boundary 520 of the gamut 502 of a CMYK process within the gamut 501 of an OMYK process is separated into a colorant vector of which the MYK colorant vector components are non-zero only. The same result would have been obtained, and is obtainable, by separating a same color vector 554 in an OMYK process using a minimum magnitude for the O colorant.

A second example using the first preferred embodiment can be summarized as:

use the minimum magnitude of K colorant (maximum magnitude C colorant) for separating the colors within the CMYK color gamut, and use the minimum magnitude of O colorant for colors belonging to the OMYK gamut but not to the CMYK color gamut.

Second Preferred Embodiment

The first steps of the second preferred embodiment correspond with the first steps of the first preferred embodiment and for reasons of redundancy are not repeated here.

According to a second preferred embodiment of the present invention, a color vector that belongs to the first color gamut is preferably separated into a colorant vector having the first opponent colorant component having any magnitude in between its possible minimum and maximum magnitude. This is preferably the case for both a color vector that belongs to only the first color gamut, or for a color vector that belongs to both the first and the second color gamut.

According to the same preferred embodiment, a color vector that belongs to the second color gamut but not to the first color gamut is preferably separated into a colorant vector having the second opponent colorant component at its minimum magnitude.

The present inventors have discovered that this approach too results in continuity of the colorant vector component magnitudes along a trajectory of color vectors that orbits across the color gamut boundary between the first and second color gamuts. This is again explained with reference of an example for which FIG. 5 is also used.

Assume that the first partial process is a CMYK process and that color vectors belonging to the gamut of the process are separated into colorant vectors using a magnitude for the K colorant that is, for example, halfway between the minimum and maximum possible magnitude.

Referring to the Second Assumption above, a color vector 554 belonging to the boundary 520 of the first color gamut 502 within the second color gamut 501 is separated into a colorant vector including non-zero MYK magnitudes of the M, Y and K colorants only.

The same result, however, is obtained, and is obtainable, by separating the same color vector 554 in an OMYK process using a minimum magnitude for the O colorant.

This demonstrates that a trajectory 550 of color vectors 551-555 that orbits across a color gamut 502 boundary of the first partial process and that is part of the color gamut 501 of the second process results in a continuous variation of the colorant component magnitudes.

An example using the second preferred embodiment can be summarized as:

use any magnitude of K colorant for separating the colors within the CMYK color gamut, and use the minimum magnitude of O colorant for colors belonging to the OMYK gamut but not to the CMYK color gamut.

The second preferred embodiment is more flexible than the first preferred embodiment in that it allows for more freedom to set the magnitude of an independent colorant is the first print process.

The first preferred embodiment can be seen as a special case of the second preferred embodiment in which the magnitude of the first opponent colorant is at its maximum magnitude.

Third Preferred Embodiment

The first steps of the third preferred embodiment also correspond with the first steps of the first preferred embodiment and for reasons of redundancy are not repeated here.

According to the third preferred embodiment of the present invention, a closed surface 604 (FIG. 6) is defined in color space that defines a volume that is entirely contained within the first color gamut.

Figure 6:
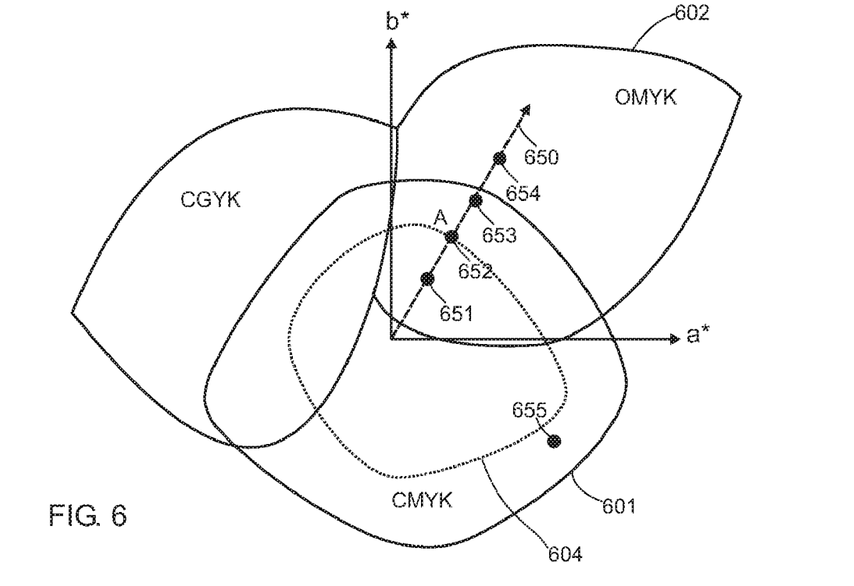
FIG. 6 shows a cross-section of the color gamuts of three four colorant process in a CIE a*b* diagram, including a trajectory and including a cross-section of a closed surface.

If a color vector 652 belongs to the surface, it is separated into a colorant vector in which both the first and second colorants have their minimum magnitude.

If a color vector 651, 655 falls within the surface or outside the surface but not within the second color gamut, it is separated into a colorant vector for the first print process using a magnitude of the first colorant component between the minimum and maximum possible magnitude to render the color. Preferably, a magnitude of the first colorant component is selected that preserves the continuity of the colorant vector component magnitudes for orbits along color vector trajectories within the surface or outside the surface but not within the second color gamut.

If a color vector 653 falls outside the surface but inside the second color gamut, it is separated into a colorant vector for the second process using a magnitude of the opponent colorant component between the minimum and maximum possible magnitude to render the color. Preferably, a magnitude of the opponent is selected that preserves the continuity of the colorant vector component magnitudes for orbits along color vector trajectories outside the surface and inside the second color gamut.

The present inventors have discovered that such an approach also results in continuity of the colorant vector component magnitudes along a trajectory of color vectors that orbits across the closed surface.

The above preferred embodiment is explained with reference to an example demonstrated by FIG. 6.

Referring to FIG. 6, a first partial process is a CMYK process having a first gamut 601 and a second partial process is an OMYK process having a second gamut 602.

The closed surface within the first gamut is for example a volume having a cross section 604.

According to a preferred embodiment of the present invention, a color vector 652 on the surface is separated into a CMYK colorant vector having minimum magnitude for the C colorant component. Hence, the colorant component includes non-zero magnitudes for the MYK colorant components only. This is the same result that would have been obtained, and that is obtainable, if the color vector is separated into an OMYK colorant vector having a zero O colorant component.

This demonstrates that a trajectory 650 of color vectors 651-654 that orbits across the closed surface 604 results in a continuous variation of the colorant component magnitudes.

The continuity of colorant component magnitudes for other trajectories is guaranteed by the Fourth Assumption above.

The third preferred embodiment is a more general case of the second preferred embodiment in which the closed surface corresponds with the color gamut boundary of the first partial print process.

Figure 7:
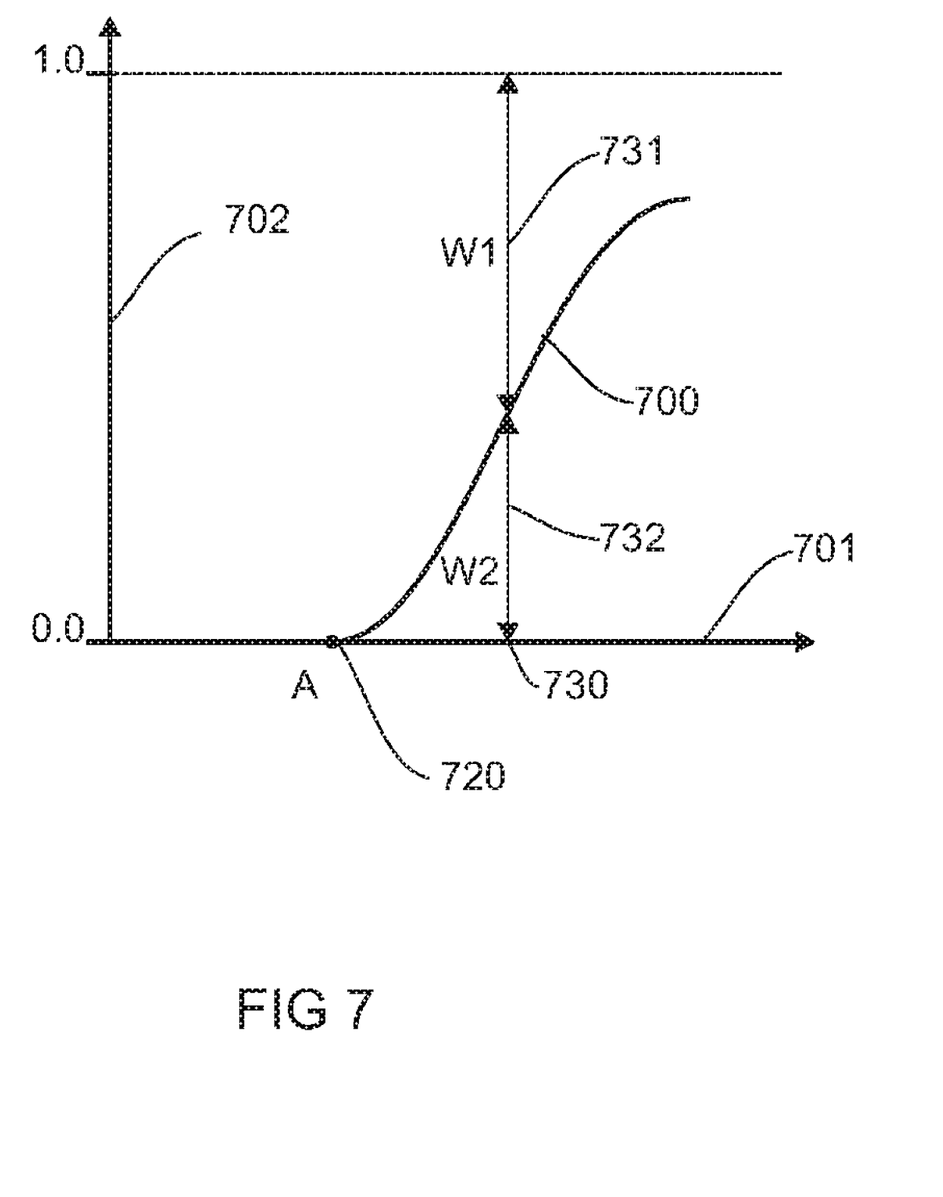
FIG. 7 shows a curve that expresses weight factors for calculating a magnitude of an opponent colorant as a function of a minimum and maximum magnitude.

In a preferred embodiment, the continuity between colorant components is obtained by programming a curve that defines the magnitude of an opponent colorant with regard to the minimum and maximum possible magnitudes to render a given color. Referring to FIG. 7, an abscissa axis 701 of such a curve 700 indicates, for example, a chroma level of a color vector 651-654 in a CIE a\*b\* diagram and corresponds with a radiant distance in the diagram from the origin. The ordinate axis 702 indicates for a color having a given chroma 730 what a weight W1 731 is for using the minimum magnitude "MinMagnitude" of the colorant and what the weight W2 732 is for using the maximum magnitude "MaxMagnitude" of the independent colorant in the second print process is. The magnitude Magnitude is then obtained as:

$$\text{Magnitude} = W1 * \text{MinMagnitude} + W2 * \text{MaxMagnitude}$$

The point 720 on the curve 700 corresponds with the color vector 652 in FIG. 6 and belongs to the closed surface. As specified in the third preferred embodiment, the magnitude of the opponent colorant of the second partial process is zero for the color vector.

Description of a System

Figure 1:
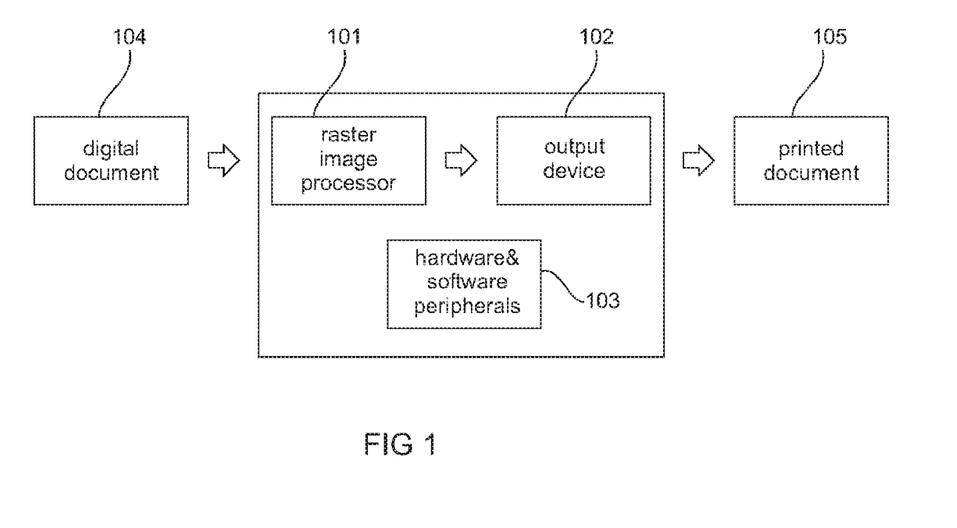
FIG. 1 shows a system according to a preferred embodiment of the present invention.

FIG. 1 shows a system according to a preferred embodiment of the present invention. The input of a system is a digital document 104 that is to be converted into a printed document 105. Usually this document 104 is represented in a device independent format such as for example TIFF, PDF®, MS-Word®, or PostScript®.

The system includes a raster image processor 101 to transform the digital document 104 into a raster image having a spatial and tonal resolution and a colorant space.

According to a preferred embodiment, the raster image processor uses a computer program such as for example "Adobe PostScript Printer Driver" commercialized by the company Adobe Systems Incorporated, located in San Jose Calif. The raster image processor also includes a color management system to separate a color vector of an object in a digital input document into a colorant vector represented in the colorant space.

The data from the raster image processor is sent to an output device 102 for producing the printed document 105.

The raster image processor 101 and the output device 102 are supported by peripheral hardware and software 103. The raster image processor program preferably runs on a data processing system. The output device 102 includes an output device controller to manage the functions of the device.

According to a preferred embodiment, the system includes a main print process including a first colorant and a second opponent colorant that is an opponent to the first colorant.

The system also includes a first partial print process including the first colorant but not the second colorant, and a second partial print process that includes the second colorant but not the first colorant. The first partial print process has a first color gamut and the second partial print process has a second color gamut.

According to a preferred embodiment of the present invention, the system renders at least one color vector that belongs to the first color gamut using a colorant vector in which both the first and second colorants have the minimum magnitude to render the color vector.

In a specific preferred embodiment, the color vector has a closest distance to the boundary of the first color gamut of at least five CIE delta E. The presence of such a color vector can be identified by printing an image that includes such a color vector with the output system, and verifying if the first and second colorant components have their minimum value, preferably zero.

Preferably, the system includes a closed surface that is entirely contained within the first color gamut such that any color vector that belongs to the closed surface is rendered using a colorant vector in which both the first and second colorants have their minimum magnitude to render the color vector.

Figure 2:
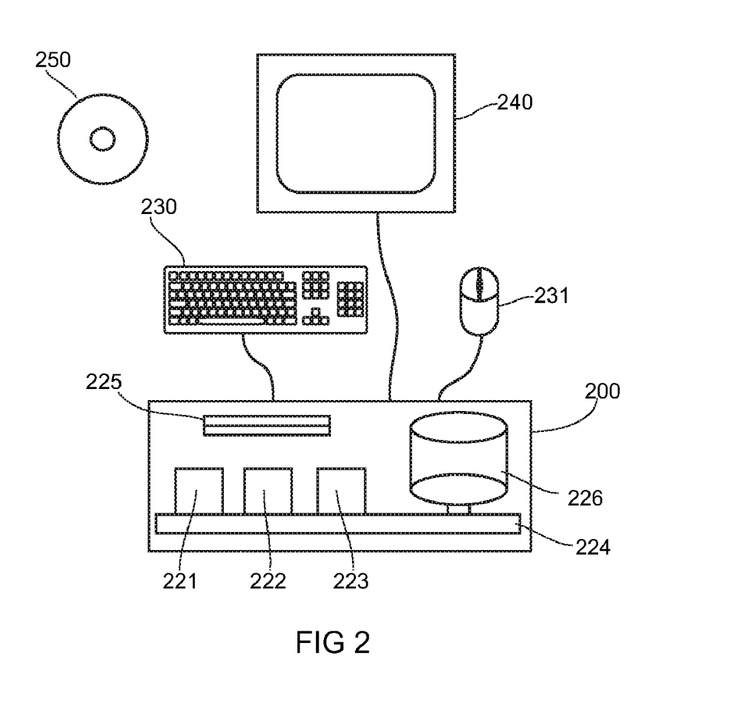
FIG. 2 shows a computer system according to a preferred embodiment of the present invention.

Referring to FIG. 2, a preferred embodiment of the present invention can be carried out on a data processing system 200 such as a computer including a network connection 221, a central processing unit 222 and a memory 223 which are all connected through a computer bus 224. The computer typically also has a computer human interface 230, 231 for inputting data and a computer human interface 240 for outputting data. According to a preferred embodiment, the computer program code is stored on a computer readable medium such as a mass storage device 226 or a portable data carrier 250 which is read by a portable data carrier reader 225.

The raster image processor 101, the output device 102 and the peripherals 103 together make up an output system.

Having explained the preferred embodiments of the present invention in detail, it should be clear to a person skilled in the art that numerous modifications exist that still fall within the scope of the present invention.

One modification includes a gamut mapping step to map a color vector that falls outside a color gamut onto a color vector that falls within a color gamut.

While many of the examples have focused on a CMYKO process, it should be clear to a person skilled in the art that the preferred embodiments of the present invention are also applicable to other print processes having any number of colorants or including other opponent colorants, for example G and B colorants, either apart or together.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method for rendering on an output device a color represented by a color vector by means of a set of colorants represented by a colorant vector wherein the colorant vector includes a first colorant component representing an amount of a first colorant and a second colorant component representing an amount of a second colorant that is an opponent to the first colorant, the method comprising the steps of:
   identifying a first partial print process having a first color gamut including the first colorant component but not the second colorant component;
   identifying a second partial print process having a second color gamut including the second colorant component but not the first colorant component;
   defining an arbitrary closed surface that is contained within the first color gamut and at least partially contained in an overlapping portion between the first color gamut and the second color gamut;
   separating a first color vector pointing to the closed surface into a first colorant vector using minimum magnitudes for both the first colorant component and the second colorant component;
   rendering on the output device a first color represented by the first color vector by means of a first set of colorants represented by the first colorant vector;
   separating a second color vector that belongs to a volume defined by the closed surface into a second colorant vector for the first partial print process;
   separating a third color vector that belongs to a cross-section of the first color gamut and second color gamut but not to the volume defined by the closed surface into a third colorant vector for the second partial print process;
   rendering on the output device a second color represented by the second color vector by means of a second set of colorants represented by the second colorant vector; and
   rendering on the output device a third color represented by the third color vector by means of a third set of colorants represented by the third colorant vector.

2. The method according to claim 1, further comprising the steps of:
   separating the second color vector using a magnitude of the first colorant component between a minimum and maximum possible magnitude to render the second color vector using a continuous model inversion process; and
   separating the third color vector using a magnitude of the second colorant component between the minimum and maximum possible magnitude to render the third color vector using a continuous model inversion process.

3. The method according to claim 1, wherein the closed surface corresponds with a gamut boundary of the first partial print process.

4. The method according to claim 1, wherein the second color vector that belongs to the first color gamut is separated using any magnitude of the first colorant component to render the second color vector;
   a fourth color vector that belongs to the second color gamut but not to the first color gamut is separated into a fourth colorant vector using a minimum magnitude of the second colorant component; and
   rendering on the output device a fourth color represented by the fourth color vector by means of a fourth set of colorants represented by the fourth colorant vector.

5. The method according to claim 1, wherein the first partial print process is a CMYK process and the second partial print processes is one of a print process including an OMYK, CGYK, and CMBK process.

6. The method according to claim 2, wherein the closed surface corresponds with a gamut boundary of the first partial print process.

7. The method according to claim 6, wherein the first partial print process is a CMYK process and the second partial print processes is one of a print process including an OMYK, CGYK, and CMBK process.

8. The method according to claim 2, wherein the first partial print process is a CMYK process and the second partial print processes is one of a print process including an OMYK, CGYK, and CMBK process.

9. The method according to claim 3, wherein the first partial print process is a CMYK process and the second partial print processes is one of a print process including an OMYK, CGYK, and CMBK process.

10. The method according to claim 4, wherein the closed surface corresponds with a gamut boundary of the first partial print process.

11. The method according to claim 10, wherein the first partial print process is a CMYK process and the second partial print processes is one of a print process including an OMYK, CGYK, and CMBK process.

12. The method according to claim 4, wherein the first partial print process is a CMYK process and the second partial print processes is one of a print process including an OMYK, CGYK, and CMBK process.

* * * * *